Patented Aug. 3, 1954

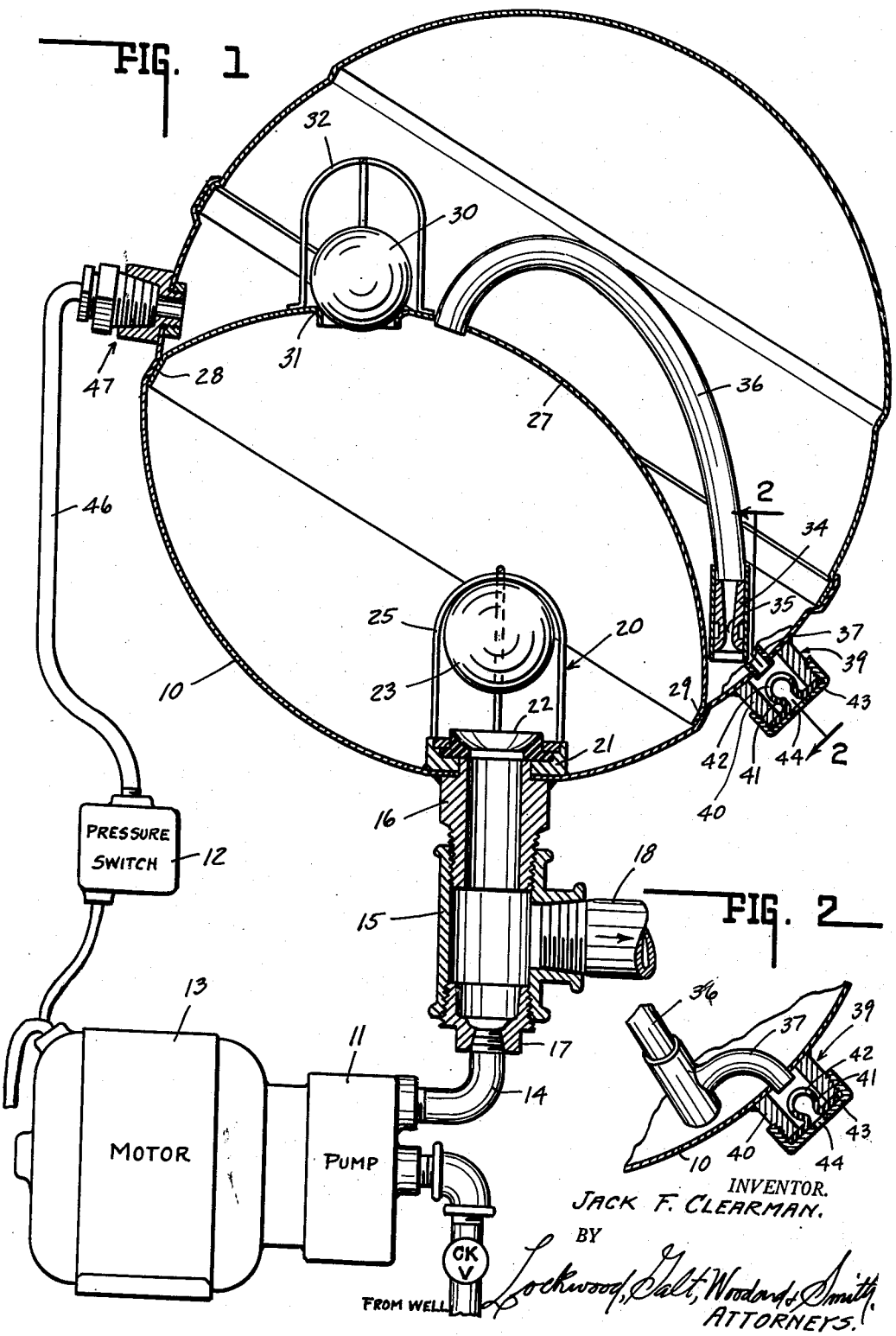

2,685,298

UNITED STATES PATENT OFFICE 2,685,298

AIR CONTROL FOR WATER SYSTEMS

Jack F. Clearman, Muncie, Ind.

Application October 25, 1952, Serial No. 316,918

5 Claims. (Cl. 137—211)

This invention relates generally to domestic water supply systems and more particularly to differential accumulator apparatus for controlling the operation of such systems.

Conventional domestic water supply systems comprise a pressure storage tank, a pump, and a pressure operated switch for starting the pump when water pressure in the tank reaches a minimum of approximately 20 pounds and for stopping the pump at the maximum water pressure of approximately 40 pounds. During the initial tank filling cycle of such systems, water is pumped into the tank increasing the pressure therein from atmospheric pressure or zero pressure to approximately 40 pounds, while subsequent cycles of operation vary the water pressure from a minimum of 20 pounds to a maximum of 40 pounds, except when water is being used faster than pump will deliver then pressure would drop below 20 pounds.

Since pressure is created within the tank simply by introducing water and trapping air therein, there is a residual or non-usable volume of water within the tank which is approximately equal in volume to 60% of the capacity of the tank. The usable volume of water which may be drawn from the tank as the pressure varies from a 40 pound maximum to a 20 pound minimum amounts to less than one sixth of the total volume of the tank. Thus, for example, to supply ten gallons of water with pressure variation between 40 pounds and 20 pounds, a tank of over 60 gallons total capacity is required, of which 36 gallons is usable only on the few occasions when pressure falls below 20 pounds. Obviously there is excessive tank expense in the conventional domestic water supply systems.

The useful capacity of a domestic water supply system may be increased to a substantial degree by reducing the residual volume of water to a bare minimum, for example only enough to cover the tank outlet port, thereby to prevent escape of air. Conversely, the total tank capacity of a conventional domestic water supply system may be reduced and the useful capacity maintained constant by reducing the residual volume of water. This result can be accomplished in either of two ways. The tank may be filled initially with air to a pressure of 20 pounds, after which water may be pumped into the tank until the usual maximum of 40 pounds is reached. Alternatively, water may be pumped into the tank in the usual way where the air pressure is equal to atmospheric pressure, and pumping may be continued until the maximum pressure of 40 pounds is reached. After this initial pumping cycle relatively small quantities of air may be added during each pumping cycle to attain a condition where sufficient air has been added that the tank is almost empty of water at 20 pounds pressure.

As disclosed in the application of Francis E. Brady, Jr., Serial No. 314,686,, filed October 14, 1952, a conventional water system may be operated in this fashion by reason of the fact that a water seal is provided for preventing escape of air into the water distribution pipes.

A principal object of this invention is to provide, in a domestic water supply system, an automatically operating means for maintaining a predetermined volume of air within the pressure tank of said system.

Another object of this invention is to provide, in a domestic water supply system, a means responsive to the existence of an excessive amount of water in a pressure tank for automatically feeding or accumulating air within said pressure tank.

In accordance with this invention there is provided an air accumulating device for domestic water supply systems comprising a means within the water supply tank for creating a flow of water, a venturi in the path of such flow of water and a valve connected to said venturi for admitting air thereto in response to flow of water through said venturi.

The full nature of the invention will be understood from the accompanying drawings and the following description and claims:

Fig. 1 is a side elevation view with parts broken away illustrating an air accumulator provided in accordance with this invention.

Fig. 2 is a cross section taken on line 2—2 of Fig. 1.

In accordance with this invention there is provided a domestic water supply system having a pressure tank 10, a motor driven pump 11 and an automatically operable pressure switch 12 adapted to close the circuit of a motor 13 for operating the pump 11 when the pressure in the tank reaches a minimum value of approximately 20 pounds and for opening the motor circuit when the pressure within the tank reaches a maximum value of approximately 40 pounds. It will be understood that these pressure limits may be varied in accordance with the limitations connected with a particular installation. The pump 11 may be connected with the tank 10 by means of a pipe 14, a T-connection 15 and a threaded tubular fitting 16 welded or otherwise attached to the shell of tank 10. The pipe 14 may be connected to the T-connection 15 by means of a threaded plug 17 in conventional fashion. The T-connection 15 may also be connected to the water distribution system by means of a pipe 18 also in conventional fashion. Floating valve assembly 20 may be connected to the fitting 16 by means of a collar 21 secured in sealed relation to the shell of tank 10 and to the inner end of fitting 16. Within collar 21 there may be provided a valve seat 22 for receiving a buoyant ball check valve 23. For confining the movement of the floating or buoyant ball 23, there is provided a cage member having a plurality of legs 25 suitably attached to collar member 21, whereby when the water in the tank is above a certain minimum level, ball 23 floats free of seat 22 permitting water to be drawn from the tank; and when the water reaches said predetermined minimum level, ball 23 seats on the seat 22 preventing outward flow of water and preserving a water seal which prevents flow of air out of the tank into the water distribution system.

For automatically accumulating air within tank 10 there is provided a partition 27 which divides the tank, and which is attached to the shell of the tank as at 28 and at 29, point 28 being at a higher level than that of point 29, the reasons for which will be explained subsequently. For sealing the space above partition 27 with respect to that below partition 27, there is provided a ball check valve consisting of a ball 30 which may seat on an annular seat member 31, and which is confined in its movement by means of a multiple legged cage 32. Thus, when water is initially pumped into tank 10, partition 27 is mounted in such relation to the remainder of the tank that water will fill the space below partition 27 and flow upwardly through the valve 30 into the space above partition 27. However, when water is drawn from tank 10, the ball 30 will seat, thereby to seal off the space above partition 27. There will, of course, be water above the right hand side of partition 27 and for exhausting this water and simultaneously injecting air within tank 10 there is provided a venturi 34 having therein a restricted passage 35 connected by means of a pipe 36 to the chamber below partition 27. Therefore, when ball 30 seats and seals off the chamber above partition 27, air pressure within this chamber causes water to flow through venturi 34 and pipe 36 into the chamber below partition 27. Venturi 34 is connected by passage 36 through a pipe 37 to a "snifter" valve 39. This valve includes a casing 40 welded to the shell of tank 10, a rubber valve member 41 having a pressure responsive bulb in which is provided a closable slit 42 which admits air when a vacuum is created by the venturi 24. The cap 43 having an aperture 44 may be threaded onto the casing 40 for sealing the rubber valve 41 thereto.

Pressure switch 12 may be connected to the interior of tank 10 by means of a pipe 46 and a conventional connection member 47, this connection being situated above partition 27, whereby the pressure within the chamber above 27 controls pressure switch 12 to initiate and terminate the operation of motor 13 and pump 11.

In operation it may be assumed that when the first pumping cycle starts, atmospheric pressure exists within tank 10. This being the case, pump 11 fills the chamber below partition 27 with water and also forces water into the chamber above partition 27 trapping air in the top of the tank and continuing to pump water until the pressure reaches a maximum of 40 pounds at which time pressure switch 12 will operate to stop the pump and ball 30 will seat. As water is drawn from the tank 10, the water will flow out of the chamber above partition 27 through venturi 34 because there will still be air pressure existing within the upper chamber which will create a flow of water through the venturi 34 and pipe 36 into the lower chamber. Such a flow of water will create a vacuum within the pipe 37 whereby air is permitted to flow through the valve 39 through the venturi and pipe 36 into the lower chamber. Such a flow of water and air continues until the upper chamber is empty of water after which water flows from the lower chamber until a minimum pressure of 20 pounds is reached, at which time the pump re-cycles to fill the tank. During each successive water withdrawal period more and more air is injected within the tank until it is completely charged with air. At this point water does not overflow into the upper chamber during a pumping cycle, and the difference in pressure between the two chambers merely causes air to flow through venturi 34 from the upper chamber into the lower chamber, and no vacuum is created on valve 38 whereby no further air will be injected into the tank.

The size of the tank 10 and the location of partition 27 are correlated so that when water is no longer present above partition 27 there will be 20 pounds pressure within the tank when the water reaches the predetermined minimum level required for closing the valve 20. When this condition exists, the maximum level of water at maximum pressure will be just below the valve 38 whereby no water will flow into the chamber above partition 27 during a pumping cycle. As air is absorbed by the water, the maximum water level will eventually open the valve 30 admitting water to the upper chamber. At this point the water withdrawal cycle will cause water to flow through venturi 34, thereby to replenish the air within the tank. Thus there is provided in accordance with this invention an automatically operated device for replenishing absorbed air within the pressure tank of a water supply system.

The invention claimed is:

1. In a water distribution system, a pressure tank, an inclined partition in said tank dividing it into an upper chamber and a lower chamber, a check valve in the upper portion of said partition for admitting water to said upper chamber during a pumping cycle when there is insufficient air within the tank to maintain a water level below said partition at maximum pressure and for sealing said upper chamber at the end of a pumping cycle and during a water withdrawal cycle, a water connection from the upper chamber to the lower chamber comprising a venturi disposed in a lower portion of said upper chamber and a pipe connecting said venturi to said lower chamber whereby pressure within said upper chamber causes water to flow into said lower chamber after said check valve is closed, and a snifter valve in the shell of said tank and connected to said venturi for admitting air thereto when water flows therein, thereby to inject air into said tank so long as water flows from said upper chamber to said lower chamber.

2. In a water distribution system, a pressure tank, a partition in said tank dividing it into an air-storage chamber and a water-storage chamber, a check valve in said partition for admitting water to said air-storage chamber during a pumping cycle when there is insufficient air within the tank to maintain water level below said partition at maximum pressure and for sealing said air-storage chamber during a water withdrawal cycle, a water connection having its intake end in the air-storage chamber and its output end in the water-storage chamber comprising a venturi disposed in a lower portion of said air-storage chamber whereby pressure within said air-storage chamber causes water to flow into said water-storage chamber after said check valve is closed, and a check valve in the shell of said tank and connected to said venturi for admitting air thereto when water flows therein, thereby to inject air into said tank so long as water flows from said air-storage chamber to said water-storage chamber.

3. In a water distribution system, a pressure tank, a partition in said tank dividing it into a first chamber and a second chamber, water supply and withdrawal means connected to said second chamber, a check valve in said partition for admitting water to said first chamber during a pumping cycle when there is insufficient air within the tank to maintain maximum water level at maximum pressure and for sealing said first chamber during a water withdrawal cycle, a water connection from the first chamber to the second chamber comprising a venturi disposed with its intake end connected to said first chamber whereby pressure within said first chamber causes water to flow into said second chamber after said check valve is closed, and a check valve in the shell of said tank and connected to said venturi for admitting air thereto when water flows therein, thereby to inject air into said tank so long as water flows from said first chamber to said second chamber.

4. In a water distribution system, a pressure tank comprising two chambers, a valve between said chambers operable for admitting water from one to the other of said chambers during a pumping cycle when there is insufficient air within the tank to maintain maximum water level at maximum pressure and closable during a water withdrawal cycle, a water connection between said chambers comprising a venturi with its intake end connected to said other chamber whereby pressure within said other chamber causes water to flow into said one chamber through said venturi after said valve is closed, and a check valve in the shell of said tank and connected to said venturi for admitting air thereto when water flows therein, thereby to inject air into said tank so long as water flows from said other chamber to said one chamber.

5. In a water distribution system, a pair of pressure chambers, a valve for admitting water from one of said chambers to the other during a pumping cycle and for sealing said chambers with respect to one another during a water withdrawal cycle, a water connection between said chambers comprising a venturi with its intake end connected to said other chamber whereby pressure within said other chamber causes water to flow into said one chamber after said valve is closed, and means connected to said venturi for admitting air thereto when water flows therein, thereby to inject air into said tank so long as water flows from said other chamber to said one chamber.

References Cited in the file of this patent

UNITED STATES PATENTS

| Number | Name | Date |
|---|---|---|
| 1,059,609 | Hollis | Apr. 22, 1913 |
| 2,354,811 | Jacuzzi | Aug. 1, 1944 |
| 2,621,596 | Jacuzzi | Dec. 16, 1952 |